United States Patent
Choi et al.

(10) Patent No.: US 8,482,155 B2
(45) Date of Patent: Jul. 9, 2013

(54) POWER CONVERTING DEVICE FOR RENEWABLE ENERGY STORAGE SYSTEM

(75) Inventors: Jongki Choi, Suwon-si (KR); Sungchun Cho, Suwon-si (KR); Jungjin Choi, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 365 days.

(21) Appl. No.: 12/819,401

(22) Filed: Jun. 21, 2010

(65) Prior Publication Data

US 2011/0140535 A1 Jun. 16, 2011

(30) Foreign Application Priority Data

Dec. 16, 2009 (KR) .................. 10-2009-0125766

(51) Int. Cl.
*H02J 5/00* (2006.01)
*H02J 7/00* (2006.01)

(52) U.S. Cl.
USPC .............................................. 307/71; 307/82

(58) Field of Classification Search
USPC ..................................................... 307/71, 82
See application file for complete search history.

(56) References Cited

U.S. PATENT DOCUMENTS

| | | | | |
|---|---|---|---|---|
| 4,052,657 A * | 10/1977 | Kleiner et al. | .................. | 363/43 |
| 5,373,195 A | 12/1994 | De Doncker et al. | | |
| 6,404,655 B1 * | 6/2002 | Welches | .......................... | 363/41 |
| 6,813,167 B2 * | 11/2004 | Nakamura et al. | ............... | 363/40 |
| 6,930,897 B2 * | 8/2005 | Jungreis et al. | .................. | 363/95 |
| 7,248,490 B2 * | 7/2007 | Olsen et al. | ..................... | 363/71 |
| 7,566,232 B2 | 7/2009 | Iida | | |
| 7,638,899 B2 * | 12/2009 | Tracy et al. | ...................... | 307/65 |
| 7,733,670 B2 * | 6/2010 | Feng et al. | ....................... | 363/17 |
| 7,880,334 B2 * | 2/2011 | Evans et al. | ...................... | 307/66 |
| 7,939,968 B2 * | 5/2011 | Hjort et al. | ....................... | 307/66 |
| 7,990,117 B2 * | 8/2011 | Benedict | ........................ | 323/271 |
| 8,008,808 B2 * | 8/2011 | Seeker et al. | .................... | 307/72 |
| 8,058,752 B2 * | 11/2011 | Erickson et al. | .............. | 307/150 |

(Continued)

FOREIGN PATENT DOCUMENTS

| | | |
|---|---|---|
| JP | 2001-268800 | 9/2001 |
| JP | 2004-180467 | 6/2004 |

(Continued)

OTHER PUBLICATIONS

English Machine Translation of Japanese Application No. 2001-26880 listed above, 5 pages.

(Continued)

*Primary Examiner* — Adi Amrany
(74) *Attorney, Agent, or Firm* — Christie, Parker & Hale, LLP

(57) ABSTRACT

A power converting device for a renewable energy storage system includes rechargeable batteries, bidirectional converters respectively connected in parallel to the batteries, direct current (DC) links connected in parallel to the bidirectional converters, respectively, bidirectional inverters connected in parallel to the DC links, respectively, and an electric power system connected to the bidirectional inverters. The bidirectional inverters are cascade H-bridge multi-level boost inverters. The DC links are charged by the bidirectional inverters connected to the battery and a charged voltage of the DC links is provided to the electric power system by the bidirectional inverters. In addition, the DC links are charged by the bidirectional inverters connected to the electric power system and a charged voltage of the DC links is provided to the battery by the bidirectional inverters.

12 Claims, 6 Drawing Sheets

U.S. PATENT DOCUMENTS

| | | | |
|---|---|---|---|
| 8,067,855 B2 * | 11/2011 | Mumtaz et al. | 307/45 |
| 8,143,856 B2 * | 3/2012 | Andrea et al. | 320/128 |
| 8,207,637 B2 * | 6/2012 | Marroquin et al. | 307/147 |
| 8,212,408 B2 * | 7/2012 | Fishman | 307/77 |
| 2006/0152224 A1 | 7/2006 | Kim et al. | |
| 2007/0296357 A1 | 12/2007 | Song et al. | |
| 2008/0062724 A1 * | 3/2008 | Feng et al. | 363/17 |
| 2008/0067869 A1 * | 3/2008 | Evans et al. | 307/11 |
| 2008/0150366 A1 * | 6/2008 | Adest et al. | 307/77 |
| 2009/0086520 A1 * | 4/2009 | Nishimura | 363/133 |
| 2009/0236916 A1 * | 9/2009 | Nishimura | 307/80 |
| 2010/0250018 A1 * | 9/2010 | Hauf et al. | 700/297 |
| 2010/0302819 A1 * | 12/2010 | O'Brien et al. | 363/95 |
| 2010/0327659 A1 * | 12/2010 | Lisi et al. | 307/82 |
| 2011/0088743 A1 * | 4/2011 | Luo et al. | 136/244 |
| 2011/0133558 A1 * | 6/2011 | Park | 307/66 |
| 2011/0144822 A1 * | 6/2011 | Choi | 700/297 |
| 2011/0148205 A1 * | 6/2011 | Moon | 307/65 |
| 2012/0043819 A1 * | 2/2012 | Kang et al. | 307/80 |
| 2012/0047386 A1 * | 2/2012 | Matsui | 713/340 |

FOREIGN PATENT DOCUMENTS

| | | |
|---|---|---|
| JP | 2006-524332 | 10/2006 |
| JP | 2009-095099 | 4/2009 |
| KR | 10-0693505 | 3/2007 |
| KR | 10-2007-0101066 | 10/2007 |
| WO | WO 2010130273 A1 * | 11/2010 |

OTHER PUBLICATIONS

English Machine Translation of Japanese Application No. 2004-180467 listed above, 9 pages.

Korean Office Action dated Apr. 11, 2001, issued by the KIPO corresponding to Korean Patent Application No. 10-2009-0125766, 4 pages.

Machine English Translation of JP 2009-095099.

* cited by examiner

POWER CONVERTING DEVICE FOR RENEWABLE ENERGY STORAGE SYSTEM

CROSS-REFERENCE TO RELATED APPLICATION

This application claims the benefit of Korean Patent Application No. 10-2009-0125766, filed Dec. 16, 2009 in the Korean Intellectual Property Office, the disclosure of which is incorporated herein by reference.

BACKGROUND

1. Field

Aspects of the present invention relate to a power converting device for a renewable energy storage system.

2. Description of the Related Art

A renewable energy storage system can be a solar cell or a wind power generator. In general, the renewable energy storage system includes a plurality of converters and a plurality of inverters for storing generated energy in various levels of alternating current (AC) or direct current (DC) power. That is to say, the renewable energy storage system needs a DC-to-AC inverter to convert DC power generated by a solar cell to AC power that is provided to an electric power system. Further, since the power generated by a solar cell has a different power level from that of a battery, a DC-to-DC converter is required to change the power generated by the solar cell to the power having a power level suitably provided to the battery.

SUMMARY

Aspects of the present invention provide a power converting device for a renewable energy storage system, which can convert DC power from a renewable energy source or battery into AC power to then provide the converted power to an electric power system, or can convert AC power to DC power to provide the converted power to the battery.

Aspects of the present invention provide a power converting device for a renewable energy storage system designed to balance or equalize voltages of the respective DC links by independently providing power from an electric power system to the respective DC links, thereby easily controlling bidirectional converters.

According to an aspect of the invention, a power converting device for a renewable energy storage system includes a plurality of rechargeable batteries, a plurality of bidirectional converters respectively connected in parallel to the plurality of batteries, a plurality of direct current (DC) links connected in parallel to the plurality of bidirectional converters, a plurality of bidirectional inverters connected in parallel to the plurality of DC links, and an electric power system connected to the plurality of bidirectional inverters.

According to an aspect of the invention, power from each battery may be converted by the plurality of bidirectional converters to then be provided to the plurality of DC links, and power from each of the plurality of DC links may be converted by the bidirectional inverters to then be provided to the electric power system.

According to an aspect of the invention, power from the electric power system may be converted by the plurality of bidirectional inverters to then be provided to the plurality of DC links, and power from each of the plurality of DC links may be converted by the plurality of bidirectional converters to then be provided to the plurality of rechargeable batteries.

According to an aspect of the invention, the plurality of bidirectional converters may convert DC power from the plurality of rechargeable batteries into a different level of DC power to then provide the converted power to the plurality of DC links, or may convert DC power from the plurality of DC links into a different level of DC power to then provide the converted power to the plurality of rechargeable batteries.

According to an aspect of the invention, the plurality of bidirectional inverter may convert DC power from the plurality of DC links into alternating current (AC) power to then provide the converted power to the electric power system, or may convert AC power from the electric power system into DC power to then provide the converted power to the plurality of DC links.

According to an aspect of the invention, the bidirectional inverters may be cascade H-bridge multi-level boost inverters that convert DC power from the DC link into AC power to then provide the converted power to the electric power system.

According to an aspect of the invention, the plurality of bidirectional inverters may be connected in series to each other.

According to an aspect of the invention, during charging of the plurality of rechargeable batteries, the plurality of bidirectional inverters may provide a voltage less than a voltage of the electric power system to each of the plurality of DC links.

According to an aspect of the invention, the plurality of bidirectional inverters may provide a voltage corresponding to a value obtained by dividing a voltage of the electric power system by the number of the plurality of DC links.

According to an aspect of the invention, the plurality of rechargeable batteries may be lithium-ion batteries or lithium polymer batteries.

According to an aspect of the invention, the power converting device may further include a switch unit between each of the plurality of bidirectional inverters and the electric power system, the switch unit connecting the plurality of bidirectional inverters in series or in parallel to each other.

According to an aspect of the invention, during discharging of the plurality of rechargeable batteries, the switch unit may connect the plurality of bidirectional inverters in series to each other.

According to an aspect of the invention, during charging of the plurality of rechargeable batteries, the switch unit may connect the plurality of bidirectional inverters in parallel to each other.

According to an aspect of the invention, during switch unit may include a plurality of three-terminal switches.

According to an aspect of the invention, the three-terminal switch may include a first terminal connected to one of the bidirectional inverters, a second terminal connected to another bidirectional inverter that is closest to the bidirectional inverter connected to the first terminal, and a third terminal connected to a higher or lower potential line connected to the electric power system.

According to an aspect of the invention, during discharging of the plurality of rechargeable batteries, the switch unit may allow the nearest adjacent bidirectional inverters to be connected in series to each other.

According to an aspect of the invention, during charging of the plurality of rechargeable batteries, the switch unit may allow the plurality of bidirectional inverters to be connected in parallel to the electric power system.

According to an aspect of the invention, during charging of the plurality of rechargeable batteries, the switch unit may allow the plurality of bidirectional inverters to provide the same voltage to each of the plurality of DC links.

According to an aspect of the invention, during charging of the plurality of rechargeable batteries, the switch unit may allow the plurality of bidirectional inverters to provide the same voltage to each of the plurality of DC links, irrespective of SOC of each of the plurality of rechargeable batteries.

According to an aspect of the invention, during charging of the plurality of rechargeable batteries, the switch unit may allow the plurality of bidirectional inverters to provide a voltage of the electric power system to each of the plurality of DC links.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
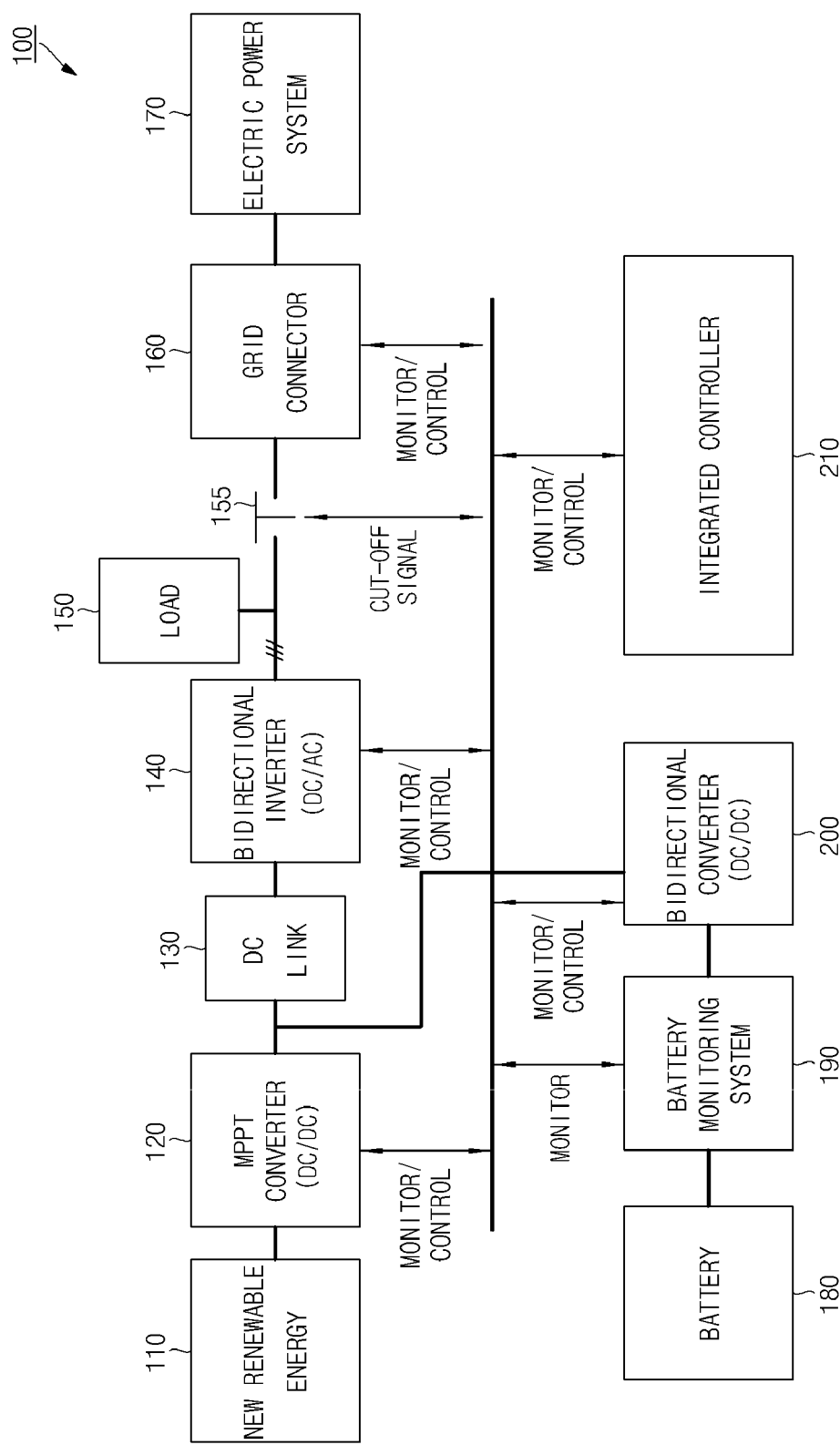
FIG. 1 is a schematic block diagram of a renewable energy storage system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. It will be understood that when an element is referred to as being "electrically connected to" another elements, it can be directly on the other elements, or intervening elements may also be present.

FIG. 1 is a schematic block diagram of a renewable energy storage system 100 according to an embodiment of the present invention. Referring to FIG. 1, the renewable energy storage system 100 includes a renewable energy 110, a Maximum Power Point Tracking (MPPT) converter 120, a Direct Current (DC) link 130, a bidirectional inverter 140, a load 150, a grid connector 160, an electric power system 170, a battery 180, a battery monitoring system 190, a bidirectional converter 200, and an integrated controller 210. While described as part of a system 100, it is understood that the renewable energy 110, the load 150, and the electric power system 170 can be connected to the remaining elements such that the renewable energy 110, the load 150, and the electric power system 170 can be separately provided.

The renewable energy 110 refers to energy generated from various renewable energy sources of power. Examples include, without limitation, sunlight, wind, water, and geothermal heat. More specifically, the renewable energy 110 is an electrical energy produced by a wind generator, a photovoltaic (PV) generator, a geothermal power generator, a wave power generator, or equivalents thereof. In the following, the renewable energy 110 is described with regard to a solar cell by way of example.

The MPPT converter 120 extracts the maximum power from the renewable energy 110 and converts the extracted power into a different level of an output DC power. By way of example, the output of the solar cell varies nonlinearly with the amount of solar radiation and surface temperature, which is the main cause of degradation in power generation efficiency of the solar cell. The MPPT converter 120 makes the solar cell operate at a maximum power point. The maximum power point varies nonlinearly with the amount of solar radiation and surface temperature. DC power extracted at the maximum power point is converted into a different level of DC power and provided to the DC link 130.

The DC link 130 temporarily stores the DC voltage supplied from the MPPT converter 120. The DC link 130 may be a substantial high capacity capacitor, but the invention is not limited thereto. Thus, the DC link 130 removes an alternating current (AC) component from the DC power output from the MPPT converter 120 and stores stable DC power. The DC link 120 also stabilizes and temporarily stores a DC voltage supplied from the bidirectional inverter 140 or the bidirectional converter 200, which will be described in detail later.

The bidirectional inverter 140 converts the DC power provided by the DC link 130 into commercial AC power and outputs the commercial AC power. More specifically, the bidirectional inverter 140 converts a DC voltage from the renewable energy 110 or the battery 180 into commercial AC power suited for home use. The bidirectional inverter 140 also converts commercial AC power provided by the electric power system 170 into DC power and feeds the DC power into the DC link 130. The power stored in the DC link 130 is provided to the battery 180 through the plurality of bidirectional converters 200.

The load 150 may be home or industrial facility using commercial AC voltage. The load 150 receives commercial AC power from the renewable energy 110, the battery 180, or the electric power system 170. While shown as connected to between the grid connector 160 and the bidirectional inverter 140, it is understood that the load 150 can instead be connected to the electric power system 170.

The grid connector 160 connects the bidirectional inverter 140 to the electric power system 170. More specifically, the grid connector 160 adjusts the range of voltage variations and suppresses harmonic frequencies. The grid connector 160 also provides AC power from which a DC component has been removed to the electric power system 170, or AC power output from the electric power system 170 to the bidirectional inverter 140.

The electric power system 170 is an electric company or an AC power system provided by an electricity generating company. For example, the electric power system 170 may include power plants, substations, other storage systems 100, and transmission lines electrically interconnected over a wide area. The electric power system 170 is commonly referred to as a 'grid.'

The battery 180 may be a secondary battery capable of charging and discharging. The battery 180 may be, for example, a lithium-ion (Li-ion) battery, a lithium polymer (Li-poly) battery or equivalents thereof, but aspects of the present invention are not limited thereto. Further, while described as a battery 180, the battery 180 can be a collection of cells and/or lower capacity batteries interconnected to form the battery 180.

The battery monitoring system 190 maintains and manages the battery 180 to be at an optimal state. More specifically, the battery monitoring system 190 monitors the voltage, current and temperature of the battery 180 and warns a user upon detection of a failure. Further, the battery monitoring system 190 calculates the State of Charge (SOC) and State of Health (SOH) of the battery 180, performs cell balancing to equalize voltages or capacities of battery cells constituting the battery 180, and controls a cooling fan (not shown) to prevent overheating of the battery 180. While not required in all aspects, the battery monitoring system 190 can be implemented using one or more processors implementing a monitoring method encoded in software and/or firmware.

The bidirectional converter 200 converts DC power from the DC link 130 into a different level of DC power suitable for charging the battery 180. The bidirectional converter 200 also converts DC power from the battery 180 into a different level of DC power suitable for use in the DC link 130. The bidirectional converter 200 may have a unitary structure, but the invention is not limited thereto. In addition, the bidirectional converter 200 may be formed of either an insulation-type or a non-insulation type.

The integrated controller 210 monitors and controls the MPPT converter 120, the bidirectional inverter 140, the grid connector 160, and the bidirectional converter 200. The integrated controller 210 also communicates with the battery monitoring system 190 to monitor the battery monitoring system 190. The integrated controller 210 substantially controls the MPPT converter 120, the bidirectional inverter 140, the grid connector 160, and the bidirectional converter 200 by sensing their voltages, currents, and temperatures. Further, the integrated controller 210 cuts off an interceptor 155 located between the load 150 and the grid connector 160 in the event of an emergency. While not required, the controller 210 can be implemented using one or more processors executing software and/or firmware read from one or more computer readable media.

Figure 2:
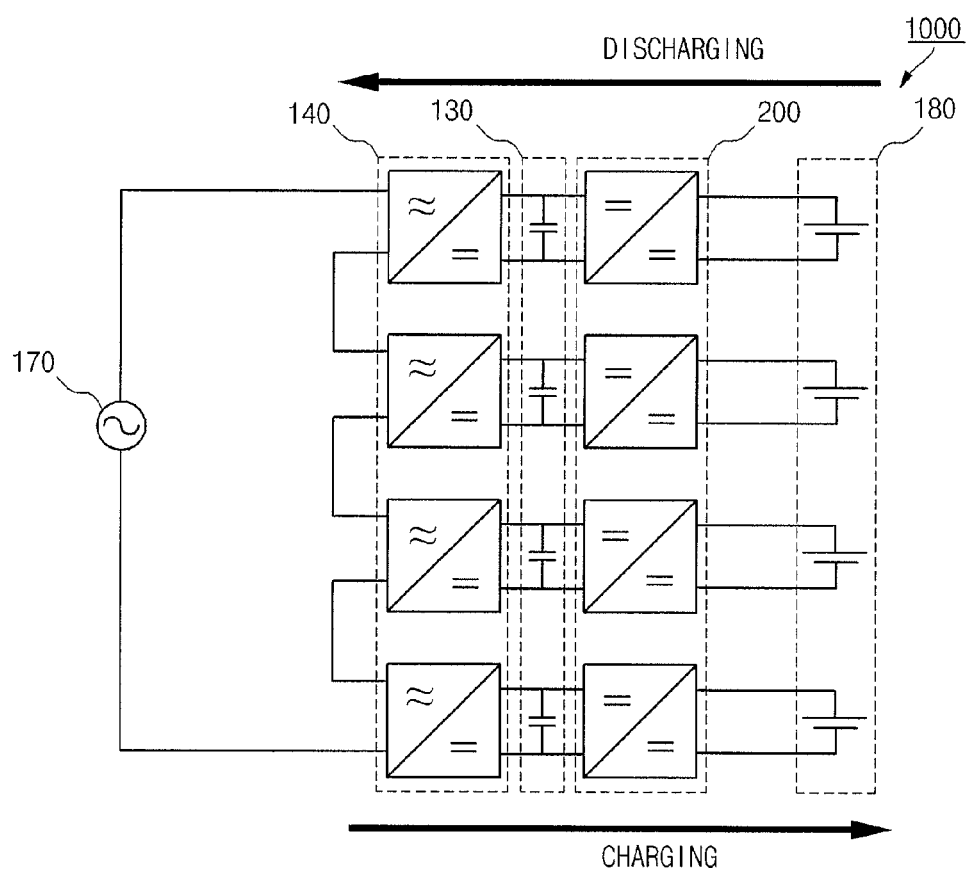
FIG. 2 is a block diagram of a power converting device for a renewable energy storage system according to an embodiment of the present invention.

FIG. 2 is a block diagram of a power converting device 1000 for a renewable energy storage system according to an embodiment of the present invention. Referring to FIG. 2, the power converting device 1000 includes a plurality of batteries 180, a plurality of converters 200, a plurality of DC links 130, a plurality of bidirectional inverters 140, and an electric power system 170. Although a battery monitoring system is not illustrated in FIG. 2, for brevity of description, it should be noted that the battery monitoring system may be connected between each of the plurality of batteries 180 and each of the plurality of bidirectional converters 200. Although a load, an interceptor, and a grid connector are not shown in FIG. 2 for a better understanding of the invention, it should also be noted that the load, the interceptor, and the grid connector may be connected between each of the plurality of bidirectional inverters 140 and the electric power system 170.

Meanwhile, the plurality of batteries 180 may be rechargeable batteries. The plurality of batteries 180 may be, for example, at least one battery with excellent stability and high capacity selected from a Li-ion battery and a Li-poly battery and equivalents thereof, but aspects of the present invention are not limited thereto. While the plurality of batteries 180 illustrated in FIG. 2 include four battery cells, aspects of the present invention are not limited thereto and other numbers of batteries 180 can be used. Further, each battery 180 can be a collection of cells and/or lower capacity batteries interconnected to form the battery 180.

The plurality of bidirectional converters 200 are connected in parallel to the plurality of batteries 180, respectively. During discharging of the plurality of batteries 180, the plurality of bidirectional converters 200 convert DC power from each of the plurality of batteries 180 into a different level of DC power and then provide the converted power to the plurality of DC links 130. During charging of the plurality of batteries 180, the plurality of bidirectional converters 200 convert DC power from each of the plurality of DC links 130 into a different level of DC power and then provide the converted power to each of the plurality of batteries 180.

The plurality of DC links 130 are connected in parallel to the plurality of bidirectional converters 200. During discharging of the plurality of batteries 180, the plurality of DC links 130 store DC power provided by the plurality of bidirectional converters 200. During charging of the plurality of batteries 180, the plurality of DC links 130 also store DC power provided from the plurality of bidirectional inverters 140.

As shown, the plurality of bidirectional inverters 140 are connected in parallel to the plurality of DC links 130, respectively. However, it is understood that the plurality of bidirectional inverters 140 may also be connected in series to each other. During discharging of the plurality of batteries 180, the plurality of bidirectional inverters 140 convert DC power from the plurality of DC links 130 into AC power to then provide the converted power to the electric power system 170. During charging of the plurality of batteries 180, each of the plurality of bidirectional inverters 140 converts AC power from the electric power system 170 into DC power to then provide the converted power to the plurality of DC links 130.

Figure 3:
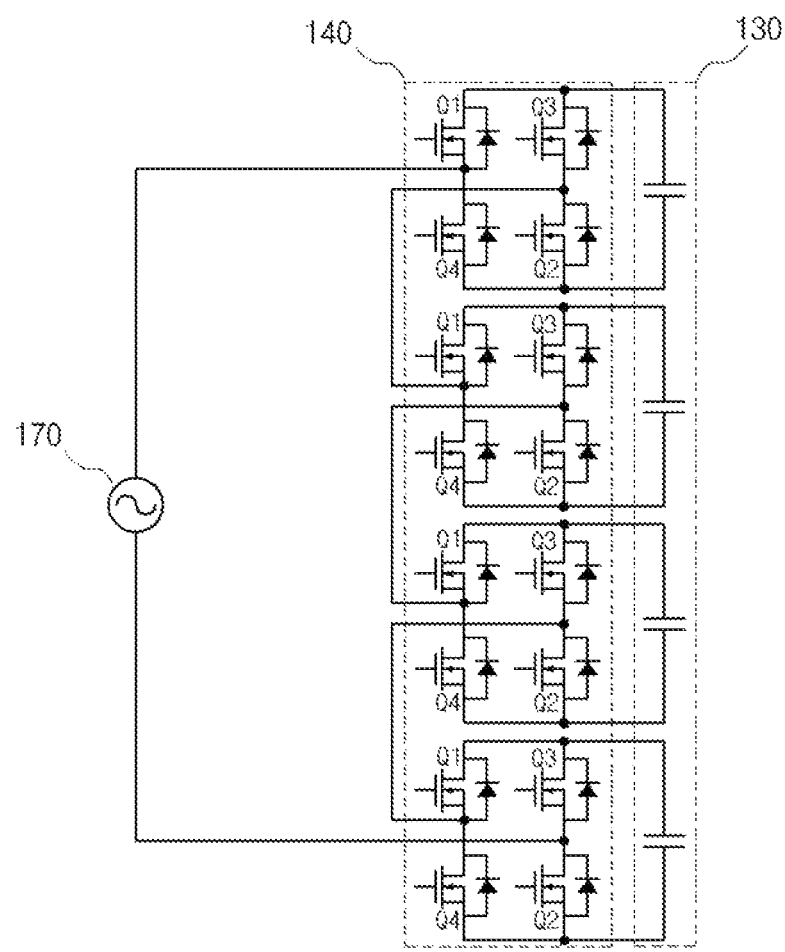
FIG. 3 is a circuit diagram of an exemplary bidirectional inverter among the plurality of bidirectional inverters 140 shown in FIG. 2.

FIG. 3 is a circuit diagram of an exemplary bidirectional inverter among the plurality of bidirectional inverters 140 shown in FIG. 2. Referring to FIG. 3, the plurality of bidirectional inverters 140 may be constructed by cascade H-bridge multi-level boost inverters including a plurality of full bridges. That is, the bidirectional inverters 140 include a plurality of full bridges having four switching elements Q1, Q2, Q3, and Q4. The full bridges are connected in cascade or series.

With this arrangement, during discharging of the plurality of batteries 180, the bidirectional inverters 140 control the on/off operation of the switching elements Q1, Q2, Q3, and Q4 to convert DC power from the plurality of DC links 130 into AC power and then provide the converted power to the electric power system 170 using a multi-level boosting method. Conversely, during charging of the plurality of batteries 180, the bidirectional inverters 140 control the on/off operation of the switching elements Q1, Q2, Q3, and Q4 to convert AC power from the electric power system 170 into DC power to then provide the converted power to the plurality of DC links 130.

The operation of the power converting device 1000 for a renewable energy storage system according to the current embodiment will now be described. First, the discharging of the plurality of batteries 180 is described. DC power from each of the plurality of batteries 180 is converted into a different level of DC power from each of the plurality of bidirectional converters 200 which is then provided to the plurality of DC links 130. Thereafter, the DC power from each of the plurality of DC links 130 is converted into AC power by the plurality of bidirectional inverters 140 which is then provided to the electric power system 170. In the shown example, the bidirectional inverters 140 convert the DC power from the plurality of DC links 130 into sine wave AC power using a multi-level boosting method. However, the invention is not limited to the shown example.

Next, the charging of the plurality of batteries 180 will be described. AC power from the electric power system 170 is converted into DC power by the bidirectional inverter 140 to then be provided to the plurality of DC links 130. In this case, since the bidirectional inverters 140 are connected in series to each other, the plurality of DC links 130 are also connected in series to each other. Thus, each of the plurality of bidirectional inverters 140 supplies a voltage less than that of the electric power system 170 to each of the plurality of DC links 130. That is, each of the plurality of bidirectional inverters 140 provides a voltage corresponding to the voltage of the electric power system 170 divided by the number of the plurality of DC links 130. For example, if the voltage of the electric power system 170 is 310 V, a voltage of 77.5 V is stored in each of the plurality of DC links 130.

Thereafter, each of the plurality of bidirectional converters 200 converts the DC power provided from each of the plurality of DC links 130 into a different level of DC power and provides the converted power to the corresponding battery cell in the plurality of batteries 180.

In such a manner, the power converting device 1000 according to the present embodiment converts DC power from each of the plurality of batteries 180 (or renewable energy) into AC power and then provides the converted power to the electric power system 170, or AC power into DC power to then provide the converted power to each of the plurality of batteries 180.

By using a Li-ion battery or Li-poly battery as a battery in the plurality of batteries 180, aspects of the present invention can provide stable, high capacity power. Thus, the bidirectional inverter 140 is able to provide a high quality sine wave AC power. Further, the power converting device 1000 does not need a separate converter for charging the plurality of batteries 180. That is, the bidirectional converters 200 act as charging converters as well. Therefore, aspects of the present invention can simplify the system configuration while reducing the manufacturing cost.

Figure 4:
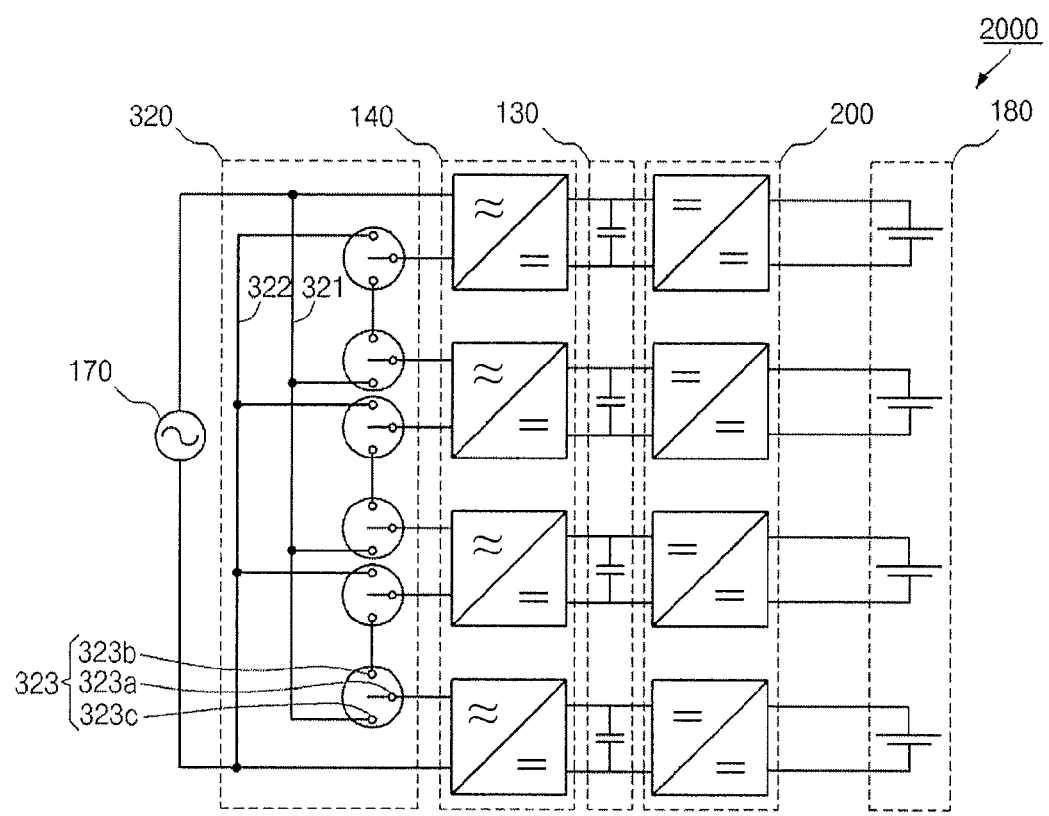
FIG. 4 is a block diagram of a power converting device for a renewable energy storage system according to an embodiment of the present invention.

FIG. 4 is a block diagram of a power converting device 2000 for a renewable energy storage system according to another embodiment of the present invention. Referring to FIG. 4, the power converting device 2000 further includes a switch unit 320 disposed between a plurality of bidirectional inverters 140 and an electric power system 170. More specifically, the switch unit 320 includes a higher potential line 321, a lower potential line 322 and a plurality of three-terminal switches 323. The three-terminal switches 323 are connected between the electric power system 170 and the plurality of bidirectional inverters 140.

Each of the plurality of three-terminal switches 323 includes first through third terminals 323a through 323c. The first terminal 323a of each switch 323 is connected to the corresponding one of the plurality of bidirectional inverters 140. The second terminal 323b is connected to another bidirectional inverter 140 that is the nearest adjacent bidirectional inverter 140 (i.e., a neighboring bidirectional inverter 140 which is not connected to the first terminal 323a). The third terminal 323c is connected to the higher or lower potential line 321 or 322 connected to the electric power system 170. With this arrangement, the switch unit 320 may allow the plurality of bidirectional inverters 140 to be connected in series or in parallel to each other. In this case, each three-terminal switch 323 may be controlled by the integrated controller (210 in FIG. 1). That is, the integrated controller 210 changes a connection state of the three-terminal switch 323 depending on whether the plurality of batteries 180 are charged or discharged.

Figure 5A:
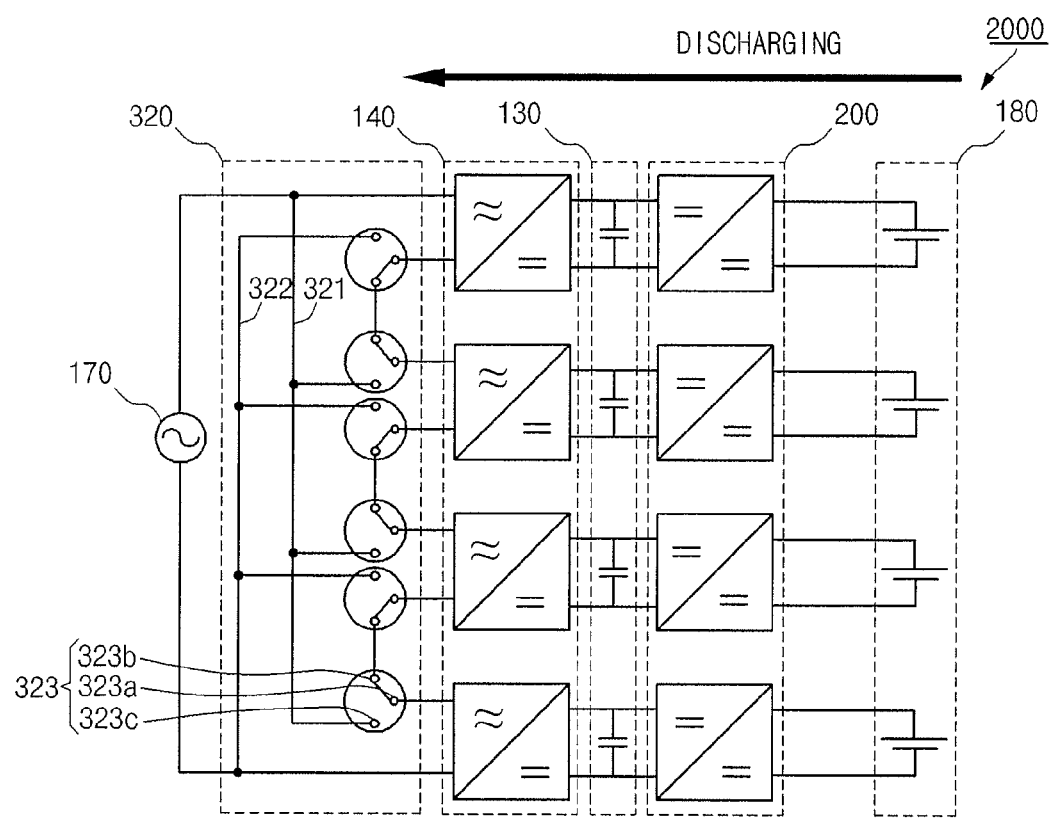
FIGS. 5A and 5B illustrate charging and discharging operations of the power converting device of FIG. 4.
Figure 5B:
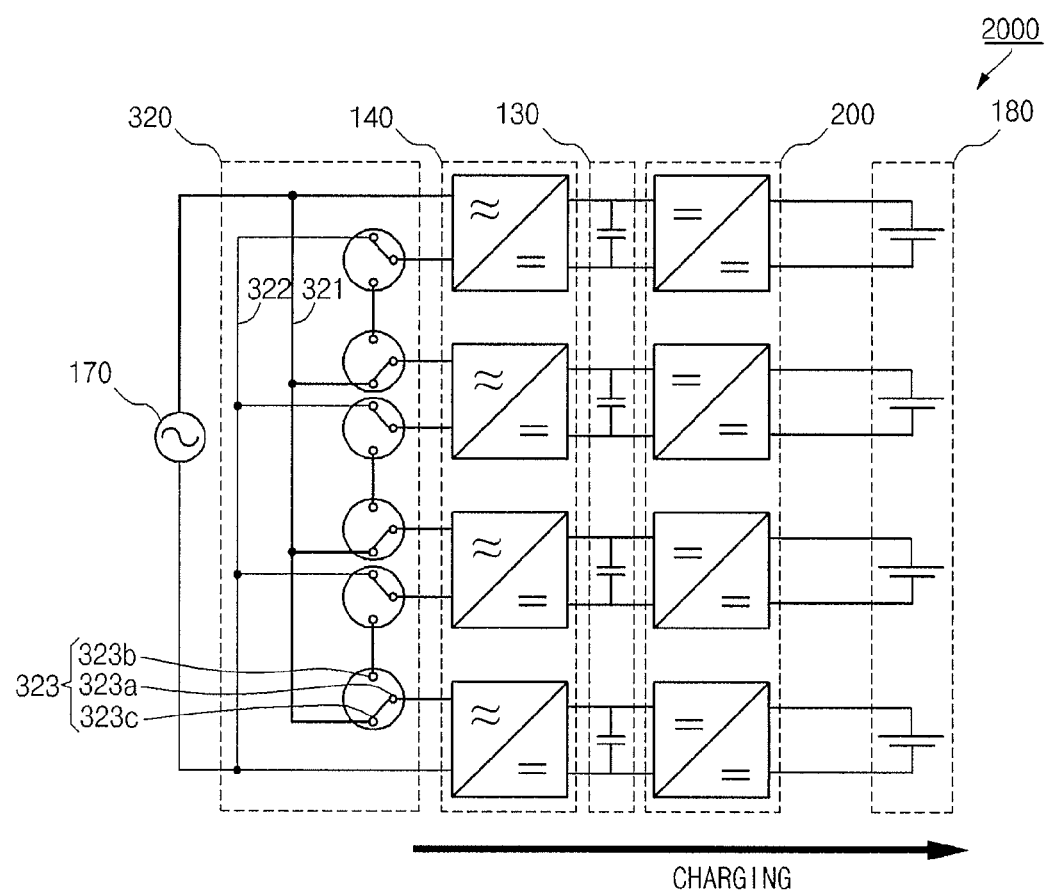

FIGS. 5A and 5B illustrate charging and discharging operations of the power converting device 2000 of FIG. 4. Referring to FIG. 5A, during discharging of the plurality of batteries 180, the switch unit 320 allows the plurality of bidirectional inverters 140 to be connected in series to each other. That is, the switch unit 320 allows two adjacent bidirectional inverters 140, which are closest to each other, to be connected in series to each other via the second terminal 323b. More specifically, the first and second terminals 323a and 323b of the three-terminal switch 320 are connected in series to each other. As the switch unit 320 operates in such a manner, the power converting device 2000 is substantially the same as the power converting device 1000 of FIG. 2 in view of configuration and operation.

That is to say, each of the plurality of bidirectional converters 200 converts DC power from each of the plurality of batteries 180 into a different level of DC power and then provides the converted power to the corresponding DC link 130. Then, the bidirectional inverter 140 converts the DC power from the DC link 130 into AC power to then provide the converted power to the electric power system 170. In this case, each of the plurality of bidirectional inverters 140 converts the DC power from each of the plurality of DC links 130 into sine wave AC power using a multi-level boosting method.

Next, referring to FIG. 5B, during charging of the plurality of batteries 180, the switch unit 320 allows the plurality of bidirectional inverters 140 to be connected in parallel to the electric power system 170. More specifically, in the three-terminal switch 320, the first and third terminals 323a and 323c are connected to each other. As the switch unit 320 operates in such a manner, the respective bidirectional inverters 140 are independently connected to the higher and lower potential lines 321 and 322, respectively.

Accordingly, the plurality of bidirectional inverters 140 may output the same voltage to the plurality of DC links 130, respectively. That is, each of the plurality of bidirectional inverters 140 may provide the same voltage of the electric power system 170 to the plurality of DC links 130. For example, if the voltage level of the electric power system 170 is 310 V, the same voltage level, that is, 310 V, is also provided to the plurality of DC links 130. In other words, the same voltage is always provided to the plurality of DC links 130, regardless of the SOC of each of the plurality of batteries 180.

In such a manner, the plurality of bidirectional converters 200 charge the plurality of batteries 180 using the voltage stored in each of the plurality of DC links 130, that is, 310 V. That is, the bidirectional converters 200 charge the plurality of batteries 180 in such a manner that SOCs of the plurality of batteries 180 are made equal. In this case, since the voltages of the plurality of DC links 130 are all the same, the plurality of bidirectional converters 200 can be easily controlled.

More specifically, in the power converting device 1000 of FIG. 2 in which voltages stored in the plurality of DC links 130 vary depending on the SOCs of the plurality of batteries 180, control of the plurality of bidirectional converters 200 is complicated. That is, the plurality of plurality of bidirectional converters 200 must be controlled in consideration of the SOCs of the plurality of batteries 180 as well as the voltages of the plurality of DC links 130. In contrast, in the power converting device 2000 of FIG. 5 in which voltages stored in the plurality of DC links 130 are the same regardless of the SOCs of the plurality of batteries 180, it is not necessary to take the voltages stored in the plurality of DC links 130 into consideration in controlling the bidirectional converters 200. That is to say, the SOC of each of the plurality of batteries 180 has only to be taken into consideration in controlling the bidirectional converters 200. As such, the plurality of bidirectional converters 200 can be easily controlled.

As described above, the power converting device for a renewable energy storage system according to the present invention is adapted to convert DC power from a renewable energy source or battery into AC power to then provide the converted power to an electric power system, or AC power to DC power to charge the battery.

The power converting device for a renewable energy storage system according to the present invention allows power from an electric power system to be independently provided to DC links, thereby balancing or equalizing voltages supplied to the respective DC links and ultimately easily controlling bidirectional converters.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A power converting device for a renewable energy storage system, the power converting device comprising:
   a plurality of rechargeable batteries;
   a plurality of bidirectional converters respectively connected in parallel to the plurality of batteries;
   a plurality of direct current (DC) links connected in parallel to the plurality of bidirectional converters;
   a plurality of bidirectional inverters respectively connected in parallel to the plurality of DC links;
   an electric power system connected to the plurality of bidirectional inverters, the plurality of bidirectional inverters being selectably connected in series to the electric power system and configured to provide power to the electric power system; and
   a switch unit between the plurality of bidirectional inverters and the electric power system, the switch unit selectively connecting the plurality of bidirectional inverters in series to each other in a first state and in parallel to each other in a second state,
   wherein during discharging of the plurality of rechargeable batteries, the switch unit is in the first state which connects the plurality of bidirectional inverters in series to each other, and
   wherein during charging of the plurality of rechargeable batteries, the switch unit is in the second state which connects the plurality of bidirectional inverters in parallel to each other.

2. The power converting device of claim 1, wherein:
   power from each of the plurality of rechargeable batteries is converted by the plurality of bidirectional converters and is provided to the plurality of DC links, and
   power from each of the plurality of DC links is converted by the bidirectional inverters and is provided to the electric power system.

3. The power converting device of claim 1, wherein:
   power from the electric power system is converted by the plurality of bidirectional inverters and is provided to the plurality of DC links, and
   power from each of the plurality of DC links is converted by the plurality of bidirectional converters and is provided to the plurality of rechargeable batteries.

4. The power converting device of claim 1, wherein the plurality of bidirectional inverters are cascade H-bridge multi-level boost inverters that convert DC power from the DC links into AC power and provide the converted power to the electric power system.

5. The power converting device of claim 1, wherein the plurality of rechargeable batteries are lithium-ion batteries or lithium polymer batteries.

6. The power converting device of claim 1, wherein the switch unit includes a plurality of three-terminal switches.

7. The power converting device of claim 6, wherein each of the three-terminal switches includes:
   a first terminal connected to one of the bidirectional inverters,
   a second terminal connected to another bidirectional inverter that is closest to the one bidirectional inverter connected to the first terminal, and
   a third terminal connected to a higher or lower potential line connected to the electric power system.

8. The power converting device of claim 1, wherein during discharging of the plurality of rechargeable batteries, the switch unit connects nearest adjacent pairs of the bidirectional inverters in series to each other.

9. The power converting device of claim 1, wherein during charging of the plurality of rechargeable batteries, the switch unit connects the plurality of bidirectional inverters in parallel to the electric power system.

10. The power converting device of claim 1, wherein during charging of the plurality of rechargeable batteries, the switch unit connects the plurality of bidirectional inverters to provide a same voltage to each of the plurality of DC links.

11. The power converting device of claim 1, wherein during charging of the plurality of rechargeable batteries, the switch unit connects the plurality of bidirectional inverters to provide a same voltage to each of the plurality of DC links, irrespective of a state of charge of each of the plurality of rechargeable batteries.

12. The power converting device of claim 1, wherein during charging of the plurality of rechargeable batteries, the switch unit connects the plurality of bidirectional inverters to provide a voltage of the electric power system to each of the plurality of DC links.

* * * * *